US009088512B1

(12) United States Patent
Rai et al.

(10) Patent No.: US 9,088,512 B1
(45) Date of Patent: Jul. 21, 2015

(54) METHOD AND SYSTEM FOR SIGNALING A WAIT TIME BEFORE DISCONTINUING TRANSMISSION OF A REVERSE LINK SIGNAL

(75) Inventors: Deveshkumar N. Rai, Overland Park, KS (US); Sachin R. Vargantwar, Macon, GA (US); Maulik K. Shah, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 189 days.

(21) Appl. No.: 13/449,759

(22) Filed: Apr. 18, 2012

(51) Int. Cl.
*H04W 24/00* (2009.01)
*H04L 1/00* (2006.01)
*H04L 12/703* (2013.01)
*H04L 12/939* (2013.01)

(52) U.S. Cl.
CPC .............. *H04L 45/28* (2013.01); *H04L 49/557* (2013.01)

(58) Field of Classification Search
CPC ........................... H04W 76/027; H04W 76/028
USPC ........................................................ 370/242
See application file for complete search history.

(56) References Cited

U.S. PATENT DOCUMENTS

| | | |
|---|---|---|
| 6,246,872 B1 | 6/2001 | Lee et al. |
| 6,480,472 B1 | 11/2002 | Jou et al. |
| 6,633,760 B1 | 10/2003 | Ham et al. |
| 6,745,031 B2 | 6/2004 | Chun et al. |
| 6,754,498 B2 | 6/2004 | Chun et al. |
| 7,010,319 B2 | 3/2006 | Hunzinger |
| 7,130,667 B2 | 10/2006 | Jin et al. |
| 7,570,976 B2 | 8/2009 | Jin et al. |
| 2001/0033579 A1* | 10/2001 | Nelson et al. ................. 370/447 |
| 2002/0068572 A1 | 6/2002 | Chun et al. |
| 2002/0090947 A1* | 7/2002 | Brooks et al. ................. 455/436 |
| 2004/0180675 A1* | 9/2004 | Choi et al. .................... 455/458 |
| 2005/0164742 A1 | 7/2005 | Rajkotia |
| 2006/0246888 A1* | 11/2006 | Bender et al. ................. 455/423 |
| 2008/0052406 A1* | 2/2008 | Kong et al. .................... 709/237 |
| 2008/0207246 A1 | 8/2008 | Shanbhag et al. |
| 2008/0233936 A1* | 9/2008 | Rajan et al. ................... 455/417 |
| 2008/0259784 A1* | 10/2008 | Allan et al. .................... 370/216 |
| 2010/0067498 A1* | 3/2010 | Lee et al. ....................... 370/336 |
| 2011/0250882 A1* | 10/2011 | Gao et al. ...................... 455/423 |
| 2012/0151246 A1* | 6/2012 | Tanaka ........................... 714/4.1 |
| 2012/0307702 A1* | 12/2012 | Nakae et al. .................. 370/311 |

OTHER PUBLICATIONS

U.S. Appl. No. 12/783,532, filed May 19, 2010.

(Continued)

*Primary Examiner* — Shaq Taha

(57) ABSTRACT

A mobile station involved in a call receives a forward link signal from a radio access network (RAN) and transmits a reverse link signal to the RAN. If the mobile station detects a reception failure of the forward link signal, such as the receipt of an errored frame, the mobile station transmits a wait time to the RAN. The wait time specifies how long the reception failure can continue before the mobile station will discontinue transmitting the reverse link signal. In response, the RAN may increase the transmit power level at which the RAN transmits the forward link signal, such that a maximum transmit power level is reached during the wait time. The wait time could be based on a user preference and/or user behavior with respect to abandoning calls.

13 Claims, 5 Drawing Sheets

(56) References Cited

OTHER PUBLICATIONS

U.S. Appl. No. 12/783,128, filed May 19, 2010.

3rd Generation Partnership Project 2, "Upper Layer (Layer 3) Signaling Standard for cdma2000 Spread Spectrum Systems," Revision E, 3GPP2 C.S0005-E, Version 2.0, Jul. 2011.

* cited by examiner

US 9,088,512 B1

METHOD AND SYSTEM FOR SIGNALING A WAIT TIME BEFORE DISCONTINUING TRANSMISSION OF A REVERSE LINK SIGNAL

BACKGROUND

In wireless telecommunication networks, such as cellular wireless networks, a radio access network (RAN) may communicate with a mobile station by transmitting forward link signals and the mobile station may communicate with the RAN by transmitting reverse link signals. When the mobile station is engaged in a call, the RAN may use a forward traffic channel to transmit forward link signals to the mobile station over and the mobile station may use a reverse traffic channel to transmit reverse link signals to the RAN.

During the call, the mobile station may monitor the forward link signals that the RAN transmits over the forward traffic channel. If the mobile station determines that it has lost contact with the RAN, the mobile station may disable its transmitter, thereby discontinuing its use of the reverse traffic channel. In a conventional approach, the mobile station determines that it has lost contact with the RAN when the mobile station fails to receive usable forward traffic channel frames during a fixed period of time.

For example, a recent spread spectrum standard, $3^{rd}$ Generation Partnership Project, "Upper Layer (Layer 3) Signaling Standard for cdma2000 Spread Spectrum Systems," Revision E, 3GPP2 C.S0005-E, Version 2.0, July 2011 (hereinafter "3GPP2 Standard") defines a constant, $N_{2m}$. The $N_{2m}$ constant is described as follows: "The duration, of insufficient signal quality (e.g. bad frames), in units of 20 ms, received on the Forward Traffic Channel before a mobile station must disable its transmitter." See 3GPP2 Standard, Table D-2 on page D-8. The $N_{2m}$ constant is given a value of 12 frames (i.e., 240 ms) in this table. Id.

OVERVIEW

In a first principal aspect, an exemplary embodiment provides a method for a mobile station. The mobile station receives a forward link signal from a radio access network (RAN) and transmits a reverse link signal to the RAN. The mobile station detects a reception failure of the forward link signal. In response to detecting the reception failure, the mobile station transmits a wait time to the RAN. The wait time specifies how long the reception failure can continue before the mobile station will discontinue transmission of the reverse link signal.

In a second principal aspect, an exemplary embodiment provides a method for a radio access network (RAN). The RAN receives at least one reverse link signal from a mobile station and transmits at least one forward link signal to the mobile station. The RAN receives a reception failure message from the mobile station. The reception failure message indicates that the mobile station has detected a reception failure of the at least one forward link signal. The reception failure message further indicates a wait time that specifies how long the reception failure can continue before the mobile station will discontinue transmission of the at least one reverse link signal.

In a third principal aspect, an exemplary embodiment provides a mobile station comprising a transceiver for receiving a forward link signal transmitted by a radio access network (RAN) and for transmitting a reverse link signal to the RAN and a controller. The controller is configured to (a) detect a reception failure of the forward link signal, (b) select a wait time, and (c) cause the transceiver to transmit the wait time to the RAN. The wait time specifies how long the reception failure can continue before the mobile station will discontinue transmission of the reverse link signal.

DETAILED DESCRIPTION OF EXEMPLARY EMBODIMENTS

1. Introduction

Figure 1:
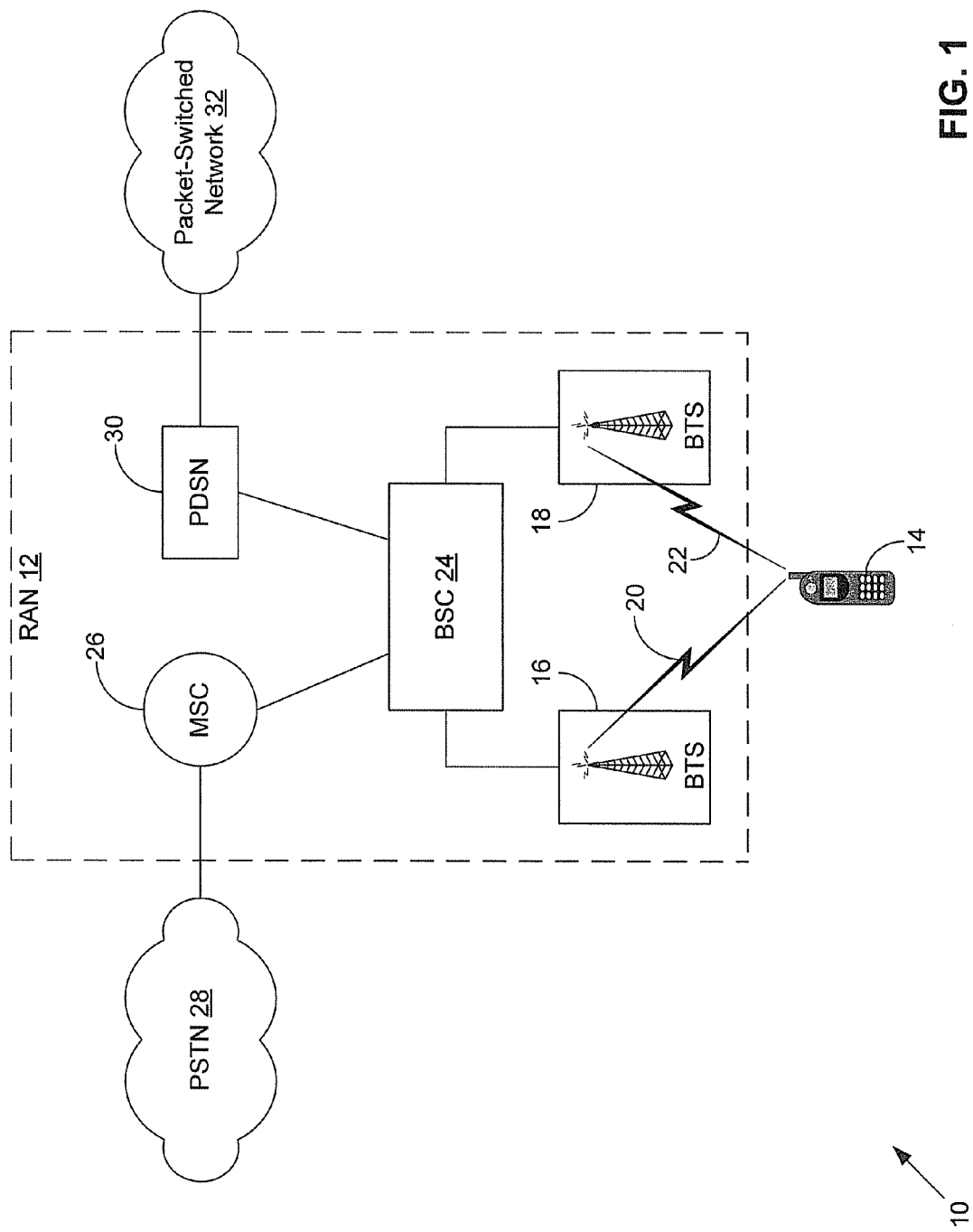
FIG. 1 is a block diagram of a wireless telecommunications network, in accordance with an exemplary embodiment.

The inventors propose methods and systems that enable a mobile station to select a wait time that specifies how long a reception failure can continue before the mobile station will discontinue transmission of a reverse link signal. A mobile station could select a wait time based on various considerations. As one example, a mobile station could select a wait time based on a user preference. In this approach, a user of a mobile station could, for example, provide input that selects a particular wait time or indicates a preference for a relatively long wait time or a relatively short wait time. As another example, a mobile station could select a wait time based on user behavior. In this approach, a mobile station could collect call abandonment statistics that indicate how long the user waited to abandon calls in prior instances in which reception failures were detected. The wait time could then be selected based on the call abandonment statistics. In addition to (or instead of) user preferences and/or user behavior, a mobile station could select a wait time based on other considerations, such as the type of mobile station, the type of RAN with which the mobile station is communicating, the mobile station's geographic location, the time of day, and/or other factors.

Once a mobile station has selected a wait time, the mobile station may provide an indication of the wait time to the RAN, for example, when the mobile station detects a reception failure. The wait time may be indicated by a reception failure message that the mobile station transmits to the RAN. In response to receiving the reception failure message, the RAN may increase a transmit power level that is used to transmit a forward link signal to the mobile station during the wait time. The rate of increase could depend on the wait time. For example, if a base transceiver station (BTS) transmits the forward link signal to the mobile station at an initial transmit power level when the reception failure message is received, a ramp rate may be selected such that the BTS increases the transmit power level of the forward link signal from the initial transmit power level to the BTS's maximum transmit power level during the wait time. In this way, the maximum transmit power level can be reached for the forward link signal before the wait time expires, i.e., before the mobile station discontinues transmission of the reverse link signal.

In the case that the mobile station is involved in a soft handoff with two or more BTSs, each transmitting a respective forward link signal to the mobile station, then each BTS could increase its transmit power level during the wait time at a respective ramp rate. The ramp rates for different BTSs could be different, for example, based on how close each BTS was to its maximum transmit power level when the reception failure message is received. Thus, in one possible scenario, a mobile station may receive a first forward link signal that is transmitted by a first BTS at its maximum transmit power level and a second forward link signal that is transmitted by a second BTS at a relatively low transmit power level. In response to a reception failure message from the mobile station, the first BTS might use a ramp rate of zero (because it is already at its maximum transmit power level) and the second BTS might use a relatively high ramp rate in order to increase its transmit power level from the initial, low level to the maximum level during the wait time.

A mobile station could use various criteria for determining when a reception failure occurs. In one approach, a reception failure may be detected whenever the mobile station detects an errored frame or a missing frame in a series of frames transmitted by the RAN over a forward traffic channel. In another approach, a reception failure may be detected whenever the mobile station detects a certain consecutive number of errored or missing frames. Other criteria could also be used.

During the wait time, the mobile station may monitor the forward link signal transmitted by the RAN to determine whether the reception failure continues for the entire wait time. Various criteria may be used to determine whether the reception failure continues for the entire wait time. In some cases, the reception failure may be considered to continue for the entire wait time when the mobile station fails to receive any non-errored frame during the wait time. In other cases, the reception failure may be considered to continue for the entire wait time when the mobile station fails to receive a sufficient number of consecutive non-errored frames during the wait time. Other criteria could also be used.

If the mobile station determines that the reception failure continues for the entire wait time, then the mobile station may discontinue transmission of the reverse link signal. For example, if the mobile station was using a reverse traffic channel for a call, the RAN may stop transmitting over the reverse traffic channel, thereby dropping the call and beneficially reducing noise on the reverse link.

If the mobile station determines that the reception failure ends during the wait time (e.g., as a result of the RAN having increased the transmit power level of the forward link signal during the wait time), the mobile station may continue transmitting the reverse link signal. Thus, if the mobile station is involved in a call, the call could be maintained.

2. Exemplary Wireless Telecommunications Network

FIG. 1 is a block diagram of a wireless telecommunications network 10 in which exemplary embodiments may be employed. Wireless telecommunications network 10 includes a radio access network (RAN) 12 that can wirelessly communicate with mobile stations, such as mobile station 14. Mobile station 14 could be, for example, a wireless telephone, a wirelessly-equipped computer (such as a handheld, laptop, or tablet computer), or other wireless communication device.

To support wireless communication with mobile stations, such as mobile station 14, RAN 12 may include one or more base transceiver stations (BTSs), exemplified in FIG. 1 by BTS 16 and BTS 18. Each of BTSs 16 and 18 provides a respective a wireless coverage area (e.g., a cell or one or more sectors) within which the BTS can wirelessly communicate with mobile stations, such as mobile station 14. The wireless coverage areas provided by BTSs 16 and 18 could be overlapping, non-overlapping, or the wireless coverage area provided by one BTS could be encompassed in or co-extensive with the wireless coverage area provided by the other BTS.

In some cases, a mobile station may be able to wirelessly communicate with more than one BTS at a time, for example, when the mobile station is involved in a soft handoff. As shown, mobile station 14 is able to communicate with BTS 16 over an air interface 20 and with BTS 18 over an air interface 22. Air interfaces 20 and 22 may each involve forward link signals that are transmitted from the BTS to the mobile station and reverse link signals that are transmitted from the mobile station to the BTS. For example, if mobile station 14 is involved in a soft handoff for a call with BTSs 16 and BTSs 18, then mobile station 14 may receive forward link signals transmitted by both BTSs and mobile station 14 may transmit reverse link signals to both BTSs. The forward link signals transmitted by BTS 16 and BTS 18 could include substantially the same media for the call but could be transmitted at different power levels. As discussed below, BTS 16 and BTS 18 could adjust the transmit power levels of the forward link signals transmitted to mobile station 14 independently of one another.

The wireless communications between RAN 12 and mobile station 14 may be in accordance with a protocol such as 1xRTT CDMA, EVDO, GSM, WiMAX (IEEE 802.16), WiFi (IEEE 802.11), UMTS, LTE, or other wireless communication protocol. In some cases, a mobile station may communicate with the RAN 12 using more than one wireless communication protocol. For example, the communications over air interface 20 could use one wireless communication protocol and the communications over air interface 22 could use a different wireless communication protocol.

Although FIG. 1 shows RAN 12 with two BTSs, it is to be understood that RAN 12 may include a greater or fewer number. RAN 12 may also include a controller, such as base station controller (BSC) 24, that controls one or more BTSs, such as BTS 16 and BTS 18. For example, BSC 24 may control the power levels at which BTSs 16 and 18 transmit forward link signals.

RAN 12 may, in turn, be communicatively coupled to one or more other types of networks. For example, RAN 12 may include a mobile switching center (MSC) 26 that is communicatively coupled to a circuit-switched network, such as PSTN 28, and to BSC 24. Alternatively or additionally, RAN 12 may include a packet data serving node (PDSN) 30 that is communicatively coupled to a packet-switched network 32, such as the Internet, and to BSC 24. It is to be understood, however, that RAN 12 could be communicatively coupled to other types of networks and/or could be configured in other ways.

With the configuration of RAN 12 shown in FIG. 1, mobile station 14 may be able to engage in a voice call with one or more endpoints via PSTN 28. Such endpoints could be for example, landline stations or other mobile stations. Mobile station 14 may also be able to engage in a data call with one or more endpoints via packet-switched network 32. Such data calls may involve the exchange of voice (e.g., VoIP communications), data, video, and/or other media, with endpoints such as VoIP devices, e-mail servers, Web servers, gaming servers, instant messaging servers, or streaming media servers.

3. Exemplary Methods

Figure 2:
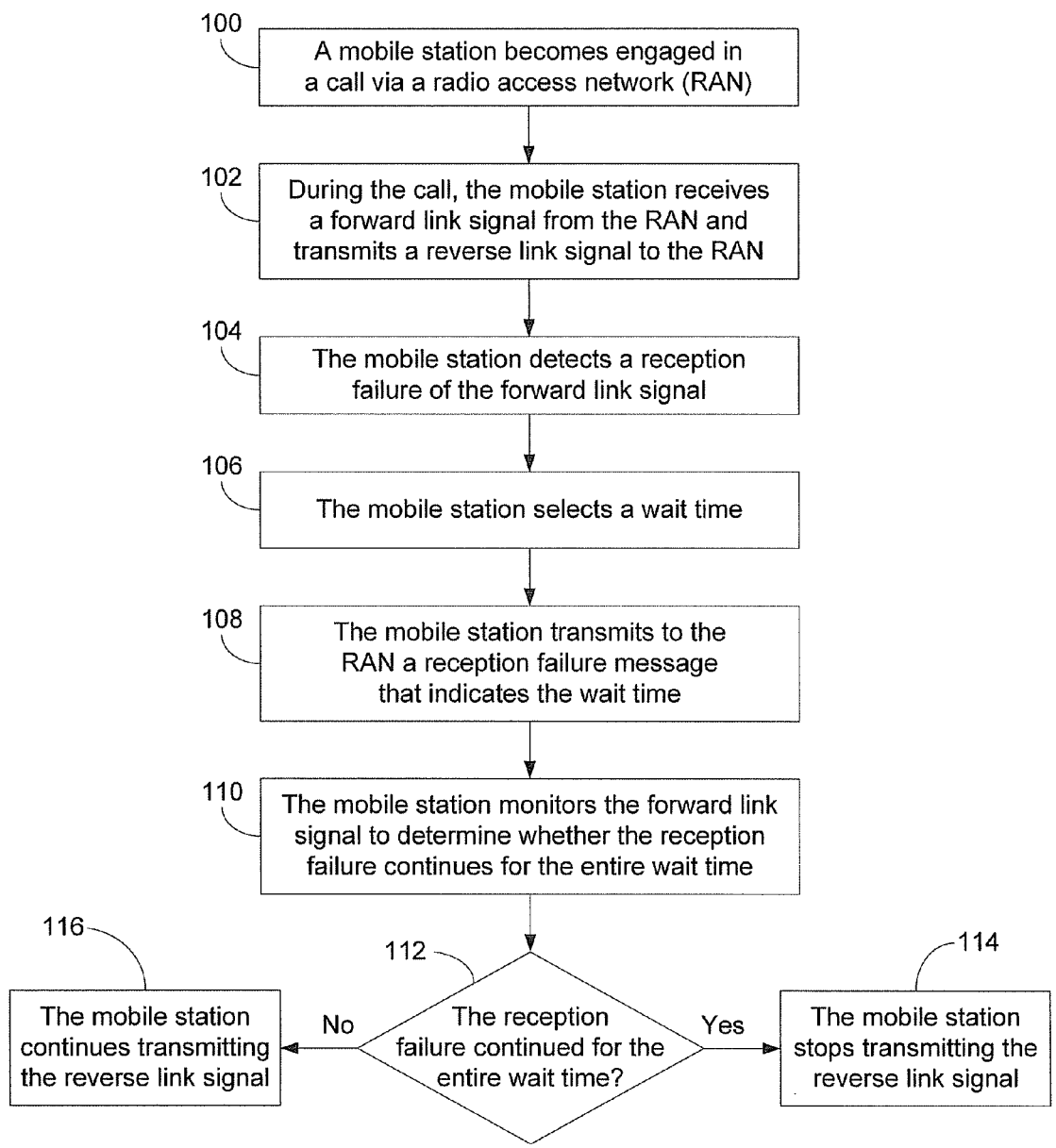
FIG. 2 is a flowchart of a method in which a mobile station detects and responds to a reception failure of a forward link signal from a radio access network (RAN), in accordance with an exemplary embodiment.
Figure 3:
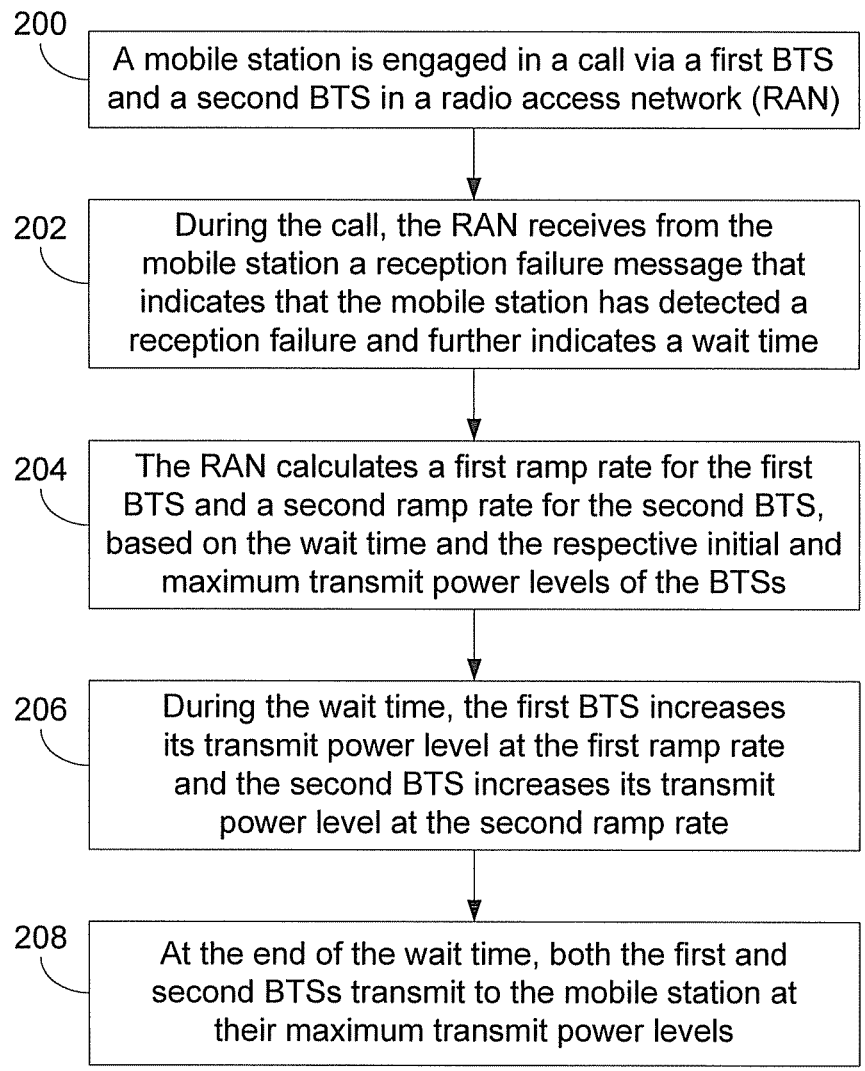
FIG. 3 is a flowchart of method in which a RAN responds to a reception failure reported by a mobile station, in accordance with an exemplary embodiment.

FIGS. 2 and 3 are flow charts illustrating exemplary methods for using a wait time when a mobile station has detected a reception failure of a forward link signal. FIG. 2 focuses on operations that are performed by the mobile station. FIG. 3 focuses on operations that are performed by the RAN. For purposes of illustration, FIGS. 2 and 3 are described with reference to the configuration of wireless telecommunications network 10 shown in FIG. 1. It is to be understood, however, that other configurations could be used.

The method illustrated in FIG. 2 begins when a mobile station (e.g., mobile station 14) becomes engages in a call via a radio access network (e.g., RAN 12), as indicated by block 100. The call could be, for example, a voice call (e.g., a call carried over PSTN 28) or a data call (e.g., a call carried over packet-switched network 32).

During the call, the mobile station may receive a forward link signal from the RAN (e.g., over a forward traffic channel) and may transmit a reverse link signal to the RAN (e.g., over a reverse traffic channel), as indicated by block 102. With reference to FIG. 1, the forward link and reverse link signals could, for example, be exchanged between BTS 16 and mobile station 14 over air interface 20.

The mobile station may monitor the signal quality of the forward link signal from the RAN, for example, with respect to signal strength and/or error rate. Based on the signal quality of the forward link signal received by the mobile station, the mobile station may send power control commands that instruct the RAN to either increase or decrease the power level at which the RAN transmits the forward link signal. For example, the mobile station may transmit a power-up command that instructs the RAN to increase its transmit power level by a fixed increment or a power-down command that instructs the RAN to decrease its transmit power level by the fixed increment. The RAN may similarly monitor the reverse link signal from the mobile station and may send power control commands to the mobile station based on the signal quality of the reverse link signal received by the RAN.

At some point, the mobile station detects a reception failure of the forward link signal, as indicated by block 104. The mobile station may detect a reception failure in various ways. In an exemplary embodiment, the RAN transmits the forward link signal in a series of coded frames. For each coded frame that the mobile station receives, the mobile station decodes it, and then determines whether the frame was received with an error, for example, by using a cyclic redundancy check (CRC). If an error is detected, the mobile station may consider the frame to be a "bad" or errored frame and may consider a reception failure of the forward link signal to have occurred. Alternatively, the mobile station may use other criteria for detecting a reception failure, such as receiving a particular number of consecutive bad frames or receiving a particular number of bad frames within a given time period. Other criteria for detecting a reception failure could also be used.

In some cases, such as when the forward link signal experiences a deep fade, the mobile station may fail to receive a frame altogether. In such cases, the mobile station may consider the missing frame to be an errored frame and apply the same criteria used for errored frames for determining whether a reception failure has occurred. Alternatively, the mobile station may apply different criteria for a missing frame. For example, the mobile station might consider a reception failure to have occurred as soon as a missing frame is detected but may require two or more consecutive errored frames before determining a reception failure based on errored frames.

When the mobile station determines that a reception failure of the reverse link signal has occurred, the mobile station selects a wait time, as indicated by block 106. The wait time specifies how long the reception failure can continue before the mobile station will discontinue transmission of the reverse link signal. The mobile station could select the wait time in various ways.

In some examples, the mobile station could select the wait time that is specific for the particular call in which it is engaged. For example, the mobile station could take into consideration one or more characteristics of the RAN and/or the BTS being used for the call (such as the wireless communication protocol that is being used, the size of the BTS's wireless coverage area, whether the BTS is in an urban or rural environment, etc.), the time of day, the current geographic location of the mobile station, whether the mobile station is moving, and/or other factors. In particular, some factors might indicate that a deep fade could be temporary (e.g., a mobile station that is moving might expect to pass an obstruction that causes a reception failure), in which case the mobile station could select a relatively long wait time so that the call is not abandoned unnecessarily. Other factors, however, might indicate that a short wait time is more appropriate. For example, the time of day might indicate that call volumes are likely to be relatively high, in which case the mobile station could select a relatively short wait time.

In other examples, the mobile station could select a wait time that has been pre-configured. A pre-configured wait time could be based on a user preference, user behavior, or otherwise provisioned into the mobile station. In one approach, the mobile station may allow a user to provide input that indicates a preference for a relatively high wait time or a relatively low wait time. The wait time could be selected by the user as part of a set-up process or as a configuration option that the user can adjust (e.g., the wait time could have a default value until changed by the user). Thus, the mobile station could select the wait time based on user input.

In another approach, the mobile station may select a wait time based on user behavior with respect to how long the user has, in prior instances, waited before abandoning a call in which a reception failure had occurred. For example, the mobile station could collect call abandonment statistics. The call abandonment statistics could identify, for each of a plurality of instances in which a call was abandoned by a user, a respective user-wait time between when a forward-link reception failure occurred and when the user indicated that the call should be abandoned. The mobile station could then select the wait time based on the user-wait times in the call abandonment statistics (e.g., the wait time could be the average of the user-wait times).

Once the mobile station has selected a wait time (either a wait time that is specific for the call or a pre-configured wait time), the mobile station transmits to the RAN a reception failure message that indicates the wait time, as indicated by block 108. In some embodiments, the mobile station may transmit the reception failure message in the reverse traffic channel that the mobile station was already using for the call. Alternatively, the mobile station could transmit the reception failure message in some other channel, such as an access channel.

As noted above, the wait time specifies how long the reception failure can continue before the mobile station will discontinue transmission of the reverse link signal. The reception failure message could indicate the wait time in various ways. As one example, the reception failure message could indicate the wait time by specifying a duration of the wait time. As another example, the reception failure message could indicate the wait time by specifying a point in time at which the wait time will end. Other ways of indicating the wait time are also possible.

The mobile station also monitors the forward link signal to determine whether the reception failure continues for the entire wait time, as indicated by block 110. For example, the mobile station may continue to receive and decode frames transmitted in the RAN's forward link signal. If the frames continue to be errored (or missing) up through the expiration wait time, the mobile station may determine that the reception failure has continued for the entire wait time. On the other hand, if the mobile station receives a "good" or non-errored frame during the wait time, the mobile station may consider the reception failure to have ended during the wait time. Alternatively, the mobile station may apply other criteria for determining whether the reception failure has ended. For example, the mobile station may require a particular number of consecutive good frames in order to determine that the reception failure has ended.

Whether the mobile station continues transmitting the reverse link signal depends on whether the reception failure continued for the entire wait time, as indicated by block 112. If the mobile station determines that the reception failure continued for the entire wait time, the mobile station stops transmitting the reverse link signal, as indicated by block 114. If not (i.e., the mobile station determines that the reception failure ended during the wait time), the mobile station continues transmitting the reverse link signal, as indicated by block 116.

In this way, the mobile station may respond to a reception failure by notifying the RAN of the reception failure and by providing information to the RAN (e.g., the wait time) that may enable the RAN to take one of more actions to try to maintain the call (such as increasing the transmit power level of the forward link signal that is transmitted to the mobile station). Further, the wait time may be selected by the mobile station so as to conform to user preferences, user behavior, and/or other criteria. FIG. 3 illustrates how the RAN may respond to a reception failure that is indicated by the mobile station.

In the example illustrated in FIG. 3, a mobile station (e.g., mobile station 14) is engaged in a call via a first BTS and a second BTS in a RAN (e.g., BTS 16 and BTS 18 in RAN 12), as indicated by block 200. Thus, in this example, the mobile station is using two BTSs for a call, such as may occur in a soft handoff. During the call, the mobile station may receive a first forward link signal from the first BTS and may receive a second forward link signal from the second BTS. The mobile station may combine the first and second forward link signals in order to obtain a combined forward link signal (e.g., to improve the signal-to-noise ratio). Similarly, the first BTS may receive a first reverse link signal from the mobile station and the second BTS may receive a second reverse link signal from the mobile station during the call. The first and second reverse link signals may be combined in the RAN (e.g., at BSC 24) to obtain a combined reverse link signal (e.g., to improve the signal-to-noise ratio).

At some point during the call, the RAN receives from the mobile station a reception failure message that indicates that the mobile station has detected a reception failure and further indicates a wait time, as indicated by block 202. The wait time specifies how long the reception failure can continue before the mobile station will discontinue transmission of its reverse link signals. As discussed above, the reception failure may correspond to an instance in which the mobile station has detected one or more errored (or missing) frames in a forward link signal. In the example of FIG. 3, the one or more errored or missing frames could occur in the first forward link signal, the second forward link signal, or in the combined forward link signal. The reception failure message from the mobile station could specify which BTS's forward link signal had the one or more errored or missing frames. Alternatively, the reception failure message could simply indicate that a reception failure had been detected, without specifying which forward link signal was responsible.

The RAN could receive the mobile station's reception failure message in various ways. In some cases, the reception failure message could be received by both the first BTS and the second BTS. Alternatively, the reception failure message could be received by only the first BTS or the second BTS, or it might be received by an entirely different BTS or receiver in the RAN. However it is received, the reception failure message may be forwarded to a control element in the RAN (e.g., BSC 24) for response.

The RAN may respond to the reception failure by having the first BTS and/or the second BTS increase the transmit power level of the forward link signals being transmitted to the mobile station. The increase for a BTS could be specified as a ramp rate that is sufficient to increase the BTS's transmit power level from an initial transmit power level (i.e., the transmit power level that was being used by the BTS when the reception failure message was received) to the BTS's maximum transmit power level before the expiration of the wait time. Thus, the RAN may calculate (e.g., at BSC 24) a first ramp rate for the first BTS and a second ramp rate for the second BTS, based on the wait time and the respective initial and maximum transmit power levels of the first and second BTSs, as indicated by block 204. The first and second ramp rates could be either the same or different. In some cases, the ramp rate for a BTS could be zero, for example, because the BTS is already at its maximum transmit power level or because the RAN has determined to increase the transmit power level of only one of the BTSs.

In the example illustrated in FIG. 3, the first and second BTSs each have a non-zero ramp rate. Thus, during the wait time, the first BTS increases its transmit power level at the first ramp rate and the second BTS increases its transmit power level at the second ramp rate, as indicated by block 206. A control element in the RAN (e.g., BSC 24) may instruct the first and second BTSs to increase their transmit power levels in this way.

At the end of the wait time, both the first and second BTSs transmit to the mobile station at their maximum transmit power levels, as indicated by block 208. At this point, the call may be either continued or discontinued, depending on whether the increase in the transmit power levels by the first and second BTS was sufficient to end the reception failure before the expiration of the wait time.

Figure 4:
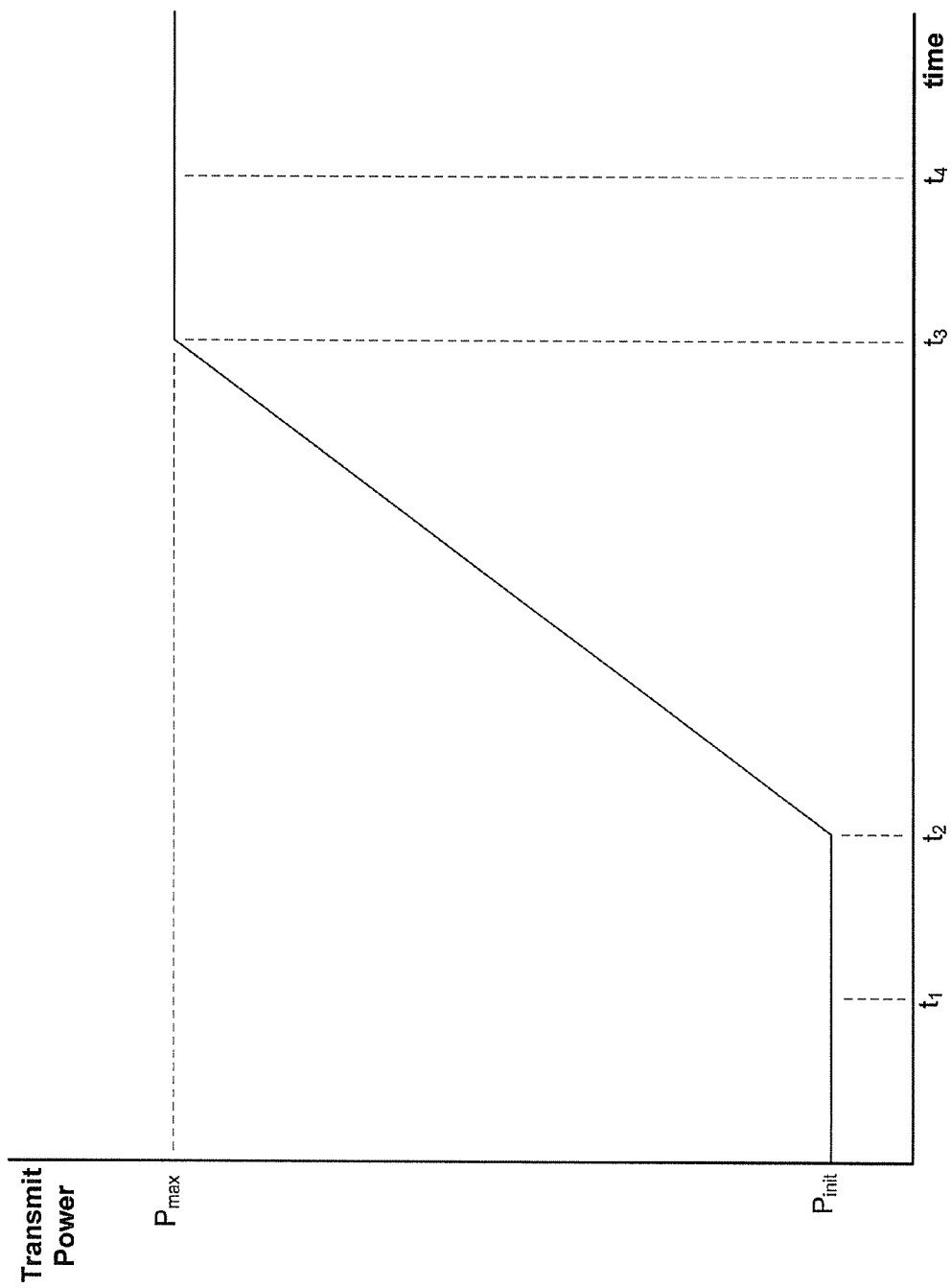
FIG. 4 is a graph of a RAN's transmit power level as a function of time, in accordance with an exemplary embodiment.

FIG. 4 illustrates how the transmit power level of a BTS in the example of FIG. 3 (either the first BTS or the second BTS) may change as a function of time. At time $t_1$, the RAN receives the reception failure message from the mobile station. At $t_1$, the BTS transmits at an initial transmit power level, $P_{init}$. At time $t_2$, the BTS begins increasing its transmit power level at a particular ramp rate. At time $t_3$, the transmit power level of the BTS reaches its maximum value, $P_{max}$. At time $t_4$, the wait time specified in the reception failure message expires. As shown in FIG. 4, the transmit power level of the BTS remains at its maximum value, $P_{max}$, from $t_3$ through $t_4$, and may also remain at the $P_{max}$ level after $t_4$.

It is to be understood that the methods illustrated in FIGS. 2, 3, and 4 are exemplary only. For example, while FIG. 2 refers to only one forward link signal, the method could also be applied to multiple forward link signals (as in FIG. 3). Similarly, while FIG. 3 is directed to an example in which two forward link signals are transmitted to a mobile station for a call, the method could also be applied to a greater or fewer number of forward link signals.

In addition, while FIG. 3 refers to the transmit power level of a BTS increasing at a particular ramp rate, and FIG. 4 shows a ramp rate being applied between $t_2$ and $t_3$, it is to be understood that a BTS could increase its transmit power level as a function of time in other ways. As one example, instead of using only one ramp rate during the wait time, a BTS might use different ramp rates during different portions of the wait time. As another example, instead of increasing transmit power in accordance with a linear ramp (as shown in FIG. 4), a BTS could increase its transmit power level in a stepwise fashion, or in some other non-linear fashion.

4. Exemplary Mobile Station

Figure 5:
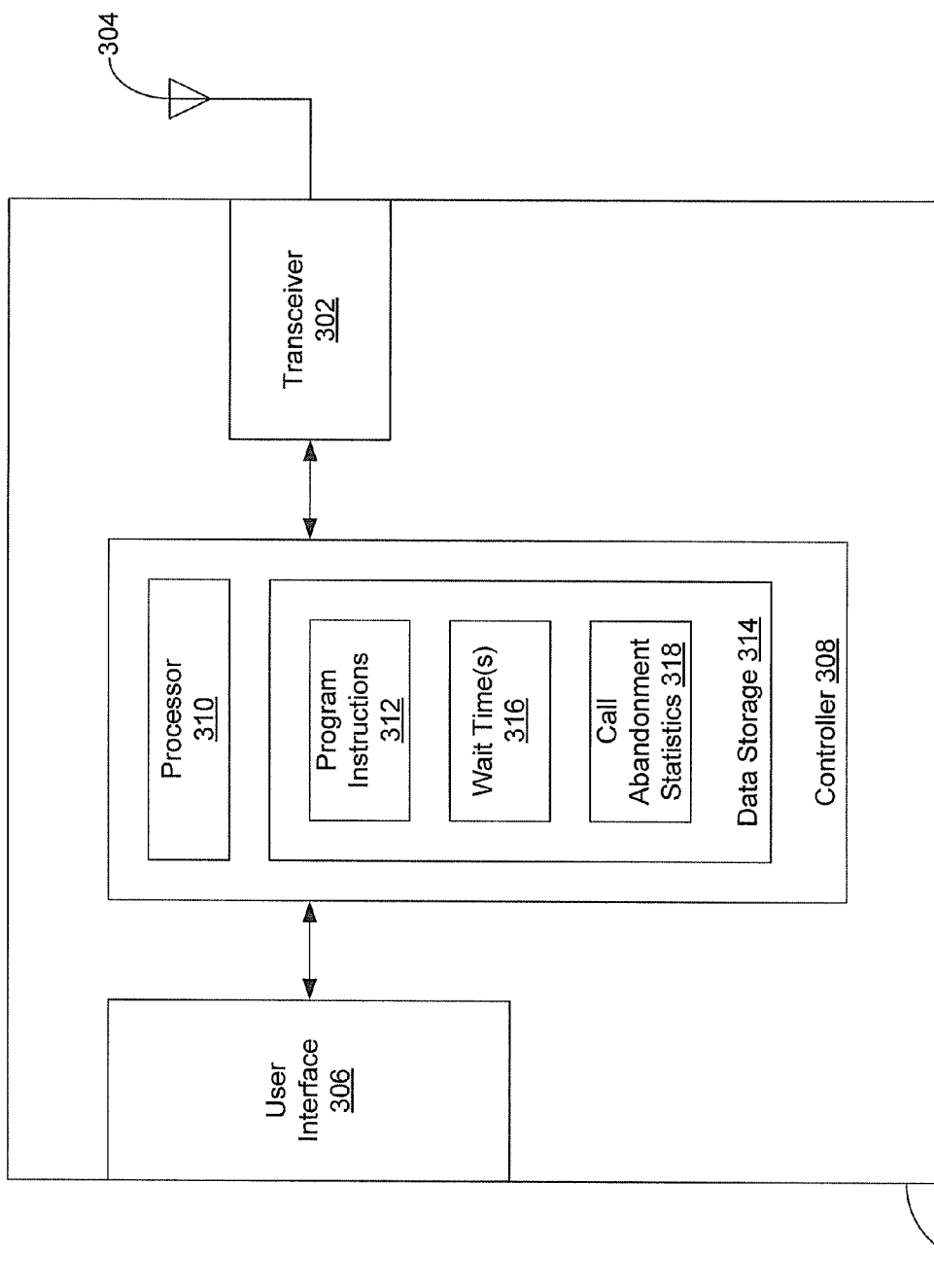
FIG. 5 is a block diagram of a mobile station, in accordance with an exemplary embodiment.

FIG. 5 illustrates an exemplary mobile station 300 that may function in accordance with the method described above and illustrated in FIG. 2. Mobile station 300 may include a transceiver 302 for communicating with a RAN (e.g., RAN 12), via one or more antennas, exemplified in FIG. 5 by antenna 304. When mobile station 300 is involved in a call, transceiver 302 may use a reverse traffic channel to transmit a reverse link signal for the call to the RAN, and transceiver 302 may receive a forward link signal for the call from the RAN over a forward traffic channel. Transceiver 302 may also be able to use other reverse link channels, such as access channels, to transmit reverse link signals to the RAN, and transceiver 302 may receive forward link signals from the RAN over other forward link channels, such as a pilot channel or a paging channel. In addition, transceiver 302 may be able to transmit reverse link signals using multiple reverse traffic channels and may be able to receive forward link signals using multiple forward traffic channels.

Mobile station 300 may include a user interface 306 that allows a user to interact with mobile station 300. User interface 306 may include a speaker and microphone that allow mobile station 300 to receive audio from the user and to convey audio to the user, for example, when mobile station 300 is involved in a voice call. User interface 306 may also include a display screen for displaying text, graphics, video or other visual information to the user and may include one or more input devices, such as a keypad, buttons, or touch screen, to receive input from the user. Such user input may involve, for example, instructions to originate calls, answer calls, and abandon calls.

Mobile station 300 also includes a controller 308, which may be communicatively coupled to transceiver 302 and user interface 306. Controller 308 may be configured to control at least some of the functions of mobile station 300. Controller 308 may be implemented as hardware, firmware, and/or software. For example, controller 308 may include a processor 310 that executes program instructions 312 stored in data storage 314.

Controller 308 may be configured to (a) detect a reception failure of a forward link signal that is received by transceiver 302, (b) select a wait time, and (c) cause transceiver 302 to transmit the selected wait time to the RAN (e.g., in a reverse traffic channel or access channel). The wait time may be selected from one or more wait times that are stored in data storage 314, as exemplified in FIG. 5 by wait time(s) 316. The selected wait time specifies how long the reception failure can continue before mobile station 300 will discontinue a reverse link signal. Thus, once controller 308 detects a reception failure in a forward link signal being used for a call, controller 308 may continue monitoring the forward link signal to determine whether the reception failure continues for the entire wait time. If the reception failure continues for the entire wait time, then controller 308 may control transceiver 302 to discontinue transmitting the reverse link signal being used for the call. Otherwise, controller 308 may control transceiver 302 to continue transmitting the reverse link signal for the call.

Controller 308 may also be configured to collect call abandonment statistics 318 in data storage 314. The call abandonment statistics 318 may identify, for each of a plurality of instances in which a call was abandoned by a user of mobile station 300 (e.g., based on the user's interaction with user interface 306), a respective user-wait time between when a forward-link reception failure occurred and when the user indicated that the call should be abandoned (i.e., how long the user waited before hanging up). Further, controller 308 may select a wait time, or determine one or more of wait time(s) 316, based on the call abandonment statistics 318. For example, controller 308 may select a wait time based on an average of the user-wait times included in call abandonment statistics 318. Other ways of selecting or determining wait times may also be used.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method, comprising:
a mobile station receiving a forward link signal from a radio access network (RAN) and transmitting a reverse link signal to said RAN;
said mobile station detecting a reception failure of said forward link signal; and
in response to detecting said reception failure, said mobile station selecting a wait time that specifies how long said reception failure can continue before said mobile station will discontinue transmission of said reverse link signal and transmitting a reception failure message to said RAN, wherein said reception failure message indicates said wait time,
wherein said mobile station selecting said wait time comprises said mobile station selecting said wait time based on call abandonment statistics, wherein said call abandonment statistics identify, for each of a plurality of instances in which a call was abandoned by a user of said mobile station, a respective user-wait time between when a forward-link reception failure occurred and when said user indicated that said call should be abandoned.

2. The method of claim 1, wherein said mobile station is involved in a call with an endpoint via said RAN.

3. The method of claim 2, wherein said mobile station receiving a forward link signal from a radio access network (RAN) and transmitting a reverse link signal to said RAN comprises:
said mobile station receiving said forward link signal for said call over a forward traffic channel;

and said mobile station transmitting said reverse link signal for said call over a reverse traffic channel.

4. The method of claim 1, wherein said forward link signal comprises a series of frames, and wherein said mobile station detecting a reception failure of said forward link signal comprises:
   determining that a frame of said forward link signal that said mobile station received was an errored frame.

5. The method of claim 4, further comprising: said mobile station determining whether said reception failure continues for said wait time; and
   if said reception failure continues for said wait time, said mobile station discontinuing transmission of said reverse link signal.

6. The method of claim 5, wherein said mobile station determining whether said reception failure continues for said wait time comprises:
   determining whether said mobile station receives a non-errored frame during said wait time.

7. The method of claim 1, wherein said mobile station selecting said wait time comprises:
   said mobile station selecting said wait time based on user input.

8. A method for a radio access network (RAN), said RAN comprising at least a first base transceiver station (BTS), said method comprising:
   said first BTS receiving a first reverse link signal from a mobile station and transmitting a first forward link signal to said mobile station;
   said RAN receiving a reception failure message from said mobile station, wherein said reception failure message indicates that said mobile station has detected a reception failure, and wherein said reception failure message further indicates a wait time that specifies how long said reception failure can continue before said mobile station will discontinue transmission of said first reverse link signal;
   in response to said RAN receiving said reception failure message from said mobile station, said first BTS increasing a transmit power level of said first forward link signal during said wait time, wherein said first BTS increasing said transmit power level of said first forward link signal during said wait time comprises said first BTS increasing said transmit power level at a ramp rate such that said transmit power level reaches a maximum transmit power level during said wait time; and
   calculating said ramp rate based on at least said wait time, said maximum transmit power level, and an initial transmit power level.

9. The method of claim 8, wherein said first BTS transmits said first forward link signal at said initial transmit power level when said RAN receives said reception failure message.

10. The method of claim 8, wherein said RAN further comprises a second BTS, wherein said second BTS receives a second reverse link signal from said mobile station and transmits a second forward link signal to said mobile station.

11. The method of claim 10, further comprising:
   said RAN calculating a second ramp rate based on at least said wait time, a maximum transmit power level of said second BTS, and an initial transmit power level of said second BTS; and
   said second BTS increasing a second transmit power level of said second forward link signal at a second ramp rate during said wait time such that said transmit power level of said second forward link signal reaches said maximum transmit power of said second BTS during said wait time.

12. A mobile station, comprising:
   a transceiver for receiving a forward link signal transmitted by a radio access network (RAN) and for transmitting a reverse link signal to said RAN; and
   a controller, wherein said controller is configured to (a) detect a reception failure of said forward link signal, (b) select a wait time based on call abandonment statistics, and (c) cause said transceiver to transmit said wait time to said RAN, wherein said wait time specifies how long said reception failure can continue before said mobile station will discontinue transmission of said reverse link signal, wherein said call abandonment statistics identify, for each of a plurality of instances in which a call was abandoned by a user of said mobile station, a respective user-wait time between when a forward-link reception failure occurred and when said user indicated that said call should be abandoned.

13. The mobile station of claim 12, wherein said controller is further configured to (d) collect said call abandonment statistics.

* * * * *